(12) United States Patent
Chatroux et al.

(10) Patent No.: US 7,791,915 B2
(45) Date of Patent: Sep. 7, 2010

(54) ELECTRIC CONVERTER FOR FUEL CELL

(75) Inventors: Daniel Chatroux, Teche (FR); Severine Marc, Visan (FR); Yvan Lausenaz, Manosque (FR)

(73) Assignee: Commissariat a l'Energie Atomique, Paris (FR)

( * ) Notice: Subject to any disclaimer, the term of this patent is extended or adjusted under 35 U.S.C. 154(b) by 537 days.

(21) Appl. No.: 10/543,977

(22) PCT Filed: Feb. 4, 2004

(86) PCT No.: PCT/FR2004/050042

§ 371 (c)(1),
(2), (4) Date: Jul. 29, 2005

(87) PCT Pub. No.: WO2004/073147

PCT Pub. Date: Aug. 26, 2004

(65) Prior Publication Data
US 2006/0170570 A1 Aug. 3, 2006

(30) Foreign Application Priority Data
Feb. 7, 2003 (FR) .................................. 03 01476

(51) Int. Cl.
H02M 7/5387 (2007.01)
(52) U.S. Cl. ........................... 363/132; 363/17; 363/98; 323/266
(58) Field of Classification Search .................... 363/27, 363/28, 25, 52–57, 96–98, 131, 127, 132; 323/266–268
See application file for complete search history.

(56) References Cited

U.S. PATENT DOCUMENTS
4,150,423 A * 4/1979 Boschert ....................... 363/25

(Continued)

FOREIGN PATENT DOCUMENTS
EP 1 014 550 6/2000

(Continued)

OTHER PUBLICATIONS

Nergaard et al., "Design Considerations for a 48 V Fuel Cell to Split Single Phase Inverter System with Ultracapacitor Energy Storage", IEEE, Jun. 2002, vol. 4, pp. 2007-2012.

(Continued)

*Primary Examiner*—Rajnikant B Patel
(74) *Attorney, Agent, or Firm*—Pearne & Gordon LLP

(57) ABSTRACT

The invention concerns an electric converter for fuel cell (P) comprising current inverter means (2), the electric converter comprising a voltage step-down chopper (1) mounted between the fuel cell (P) and the current inverter means (2), wherein, under the action of a command signal applied to the voltage step-down chopper (1):
the value of the mean voltage at the input of the current inverter means is lowered to a threshold value (Vs) in the cell electrode activation zone,
the value of the mean voltage at the input of the current inverter means (2) is maintained at the voltage value at the cell terminals (Vp) in the cell resistance zone, and
the output current of the converter is limited when the output current from the current inverter means (2) reaches a maximum set value (Imax).

13 Claims, 8 Drawing Sheets

U.S. PATENT DOCUMENTS

| | | | |
|---|---|---|---|
| 4,407,903 A | | 10/1983 | Gutbier et al. |
| 4,686,615 A | * | 8/1987 | Ferguson ..................... 363/17 |
| 4,736,149 A | * | 4/1988 | van den Eijnden ............ 363/17 |
| 5,006,782 A | | 4/1991 | Pelly |
| 5,547,777 A | * | 8/1996 | Richards ...................... 429/32 |
| 5,781,421 A | * | 7/1998 | Steigerwald et al. ..... 363/21.08 |
| 6,177,736 B1 | | 1/2001 | Raiser |
| 6,504,323 B2 | * | 1/2003 | Yuda et al. .................. 315/307 |
| 6,590,360 B2 | * | 7/2003 | Hirata et al. ................ 318/727 |
| 2003/0012038 A1 | | 1/2003 | Welches et al. |

FOREIGN PATENT DOCUMENTS

| | | |
|---|---|---|
| EP | 1 091 437 | 4/2001 |
| WO | WO 02/29916 | 4/2002 |

OTHER PUBLICATIONS

Liu et al., "Power Balance Control and Voltage Conditioning for Fuel Cell Converter With Multiple Sources", IEEE, Jun. 2002, vol. 4, pp. 2001-2006.

* cited by examiner

ELECTRIC CONVERTER FOR FUEL CELL

TECHNICAL AREA AND PRIOR ART

The invention pertains to an electric converter for fuel cell.

Fuel cells are used as electric power source in numerous applications.

Among others, they are proposed as power source in electric motor vehicles (cars, buses, electrically propelled boats, etc.) to replace internal combustion engines. This makes it possible to reduce local pollution generated by motor vehicles.

A fuel cell is an electrochemical generator whose electrodes are continuously supplied with fuel and oxidant. For application to motor vehicles, the technology chosen is chiefly PEMFC technology i.e. Proton Exchange Membrane Fuel Cells supplied with hydrogen and with oxygen from air.

The hydrogen used may be stored in a tank onboard the vehicle. In this case it is hydrogen that is used as energy vector in chemical form. The fuel cell converts this chemical energy into the electric energy required by the vehicle's electric motors.

The hydrogen used may also be produced onboard the vehicle from hydrocarbons by means of a reformer circuit. This solution provides a better yield than internal combustion engines during cruising phases when power needs are low.

A fuel cell is a special electric generator since each element of the cell provides a very low DC full-load voltage in the order of 0.5 volt to 0.8 volt. Depending upon applications, to achieve sufficient electric voltage so as to be able to use or convert this energy, a large number of cells are associated in series. For example, a stack of a hundred or so cells in series can produce a full-load operating voltage of 60 to 80 volts. According to applications, several stacks of cells in series are used. These stacks are associated in series and/or in parallel.

In applications for vehicles or stationary generators, the electric energy produced is not directly adapted for use. Firstly the fuel cell does not provide a constant voltage, and secondly the produced voltage is low.

Electric motors use internal AC voltages. It is the variations in direction of these voltages which allow rotation of the magnetic field produced by the electric currents. This rotating magnetic field drives the motor in rotation.

For DC motors, the generation of AC voltages from a DC voltage was made in the past by systems using brushes and collector rings. At the present time, for reasons of performance and lifetime, mechanical switching by brushes and collector rings is most often replaced by an inverter with transistors. In this case, three sinusoidal AC currents are generated for the motor windings that are of same amplitude and are phase shifted by $2\pi/3$, enabling a rotating magnetic field of constant amplitude to be produced. It is then possible to obtain rotation of the motor with no torque jolt.

The voltage inversion required to generate AC voltage from DC voltage is slowed down by the inductance of the windings and motor cablings. This physical phenomenon is more detrimental the more the operating voltage of the motor is low. A low voltage corresponds to a strong current, hence high energy stored in the internal inductances of the motor and cabling. Electric power supplied in the form of low voltage and strong current is also a major constraint with respect to the sizing and losses of the brushes and collector rings or of the electronic converter performing this function.

In practice, for high-powered motors (typically more than 10 KW), the operating voltage of the motor is high (typically greater than 100 volts, and often in the order of 200 or 400 AC volts).

A twofold standardization of applications is currently being observed:

- motors using voltages in the order of 200 AC volts generated by an inverter with IGBT transistors (IGBT: <<Insulated Gated Bipolar Transistor>>) having a maximum voltage 600 volts, this inverter being supplied by a voltage in the order of 300 volts,
- motors using voltages in the order of 400 AC volts generated by an inverter with IGBT transistors of maximum voltage 1200 volts, this inverter being supplied by a voltage in the order of 600 volts.

The standardisation of applications in the two above cases is due to the physical limitations set forth above, which translate as poor performance for high-power motors supplied with low voltages (typically less than 100 volts) and to the existence of effective industrial solutions for motors and inverters supplied by electric grids.

The voltage at the terminals of a fuel cell varies considerably in relation to supplied current. FIG. 1 illustrates the voltage variation Vp at the terminals of a fuel cell in relation to the current I supplied by the cell.

The no-load voltage of the element (case when I=0) is voltage Uo, of 1.23 volts for example for a PEMFC fuel cell operating at ambient pressure and temperature. Beyond voltage Uo, three voltage variation Vp zones can be distinguished. A first zone (I) is a cell electrode activation zone in which voltage Vp drops rapidly when current is increased. A voltage drop then occurs at the electrodes with respect to voltage Uo. A second zone (II), called resistance zone, then occurs during which the cell behaves as a generator of low internal resistance. Beyond the second zone (II), a third zone (III) occurs, called diffusion zone, in which the current of the fuel cell is limited by the rate of diffusion of the fuel and oxidant inside the cell. In the diffusion zone, voltage is greatly reduced whilst current only increases slightly.

A stack of one hundred cells in series has a no-load voltage of 100×Uo, i.e. substantially 120 volts. Under load, the voltage used may drop down to voltages in the order of 80 volts or 60 volts. A higher voltage corresponds to a better yield, but to lower delivered power. According to application, priority is given to yield or power density (hence cost).

The electric architecture of a vehicle must give consideration to the two constraints related to a fuel cell, namely the low DC voltage of the unit element of the cell and the strong variation in voltage. Usual applications often require one or more electric energy converters and buffer storage means for this electric energy.

In a vehicle, electric power is needed to start up the fuel cell ancillaries before it is able to provide energy. The motors then use AC voltages of a few hundred volts, at variable frequencies that must be generated from a DC voltage. In addition, buffer electric storage may prove to be necessary to provide additional power for acceleration without over-sizing the fuel cell and to recover energy on braking.

Indeed, the use of a fuel cell requires a system approach in relation to the needs of each application. Depending upon energy storage time scales, the capacitors, super-capacitors or various battery technologies must be suitably adapted. Between the fuel cell, possible energy storages and uses of this energy, electric/electric converters are required. They are used to perform and control energy transfers.

The converter increases the voltage derived from the fuel cell. Most electric supplies for vehicles require an operating voltage that must be higher than the supply voltage provided by a fuel cell. A DC/DC step-up converter is therefore necessary to step up the voltage delivered by a fuel cell to the required voltage level.

Different techniques are known for the use of fuel cells in motor vehicles.

According to a first technique, the output voltage of a fuel cell is used directly. Various systems exist, that are more or less similar, which directly use a bus for the highly variable voltage derived from fuel cells. This is the case for example for the system described in patent U.S. Pat. No. 4,407,903 or in the system described in the article titled: <<A 3 kW isolates bidirectional DC/DC converter for fuel cell electric vehicle application>> (Power Conversion and Intelligent Motion Conference PCIM 2001 [Lizhi Zhu et al.]). In the latter system, the fuel cell provides a voltage in the order of 200-400 volts for the supply of vehicle traction and air conditioning in particular and a 12 volt battery via a bi-directional converter. The 12-volt voltage is used to supply conventional loads such as lamps and electronic controls.

According to a second technique, the voltage supplied at the output of a fuel cell is converted into a perfectly regulated or scarcely variable voltage (voltage of a buffer battery for example).

FIG. 2 illustrates the case of perfectly regulated voltage. A converter C is positioned at the output of the fuel cell P and a bi-directional converter Cb is positioned upstream of a battery B. The converter C and the bi-directional converter Cb are mounted on a voltage bus T. The bi-directional converter Cb has a regulating effect since it can supply or absorb energy. In this way fully regulated voltage is obtained, provided the power limits of the converters and storage limits are not reached.

FIG. 3 illustrates the case when voltage is scarcely variable. Battery B here is directly connected to the voltage bus T. Since the battery has a scarcely variable voltage, it is the battery which imposes the voltage of the bus. This variant is described for example in patent EP 1 091 437.

Today's electric vehicles require two voltage sources, one high voltage (e.g. 400V DC) and the other low voltage (e.g. 12V DC). Patent U.S. Pat. No. 6,177,736 discloses an example of a converter generating these two voltages. Using a step-up chopper assembly, the voltage delivered by a fuel cell is converted into two voltages of respectively 400V and 12V.

To conclude, in the above-described prior art there appear to be three main uses of the voltage provided by a fuel cell in an electric vehicle:
1) direct use of the voltage from the fuel cell,
2) conversion of the voltage from the fuel cell into a perfectly regulated voltage,
3) conversion of the voltage from a fuel cell into a scarcely variable voltage.

Concerning the first use (direct use), it is observed that a variation in voltage by a factor in the order of two at the terminals of the fuel cell requires over-sizing of the motors, associated inverters and electric converters used. In an application in which, for example, the voltage provided by a fuel cell varies between 200 and 400V, the direct use of this voltage implies over-dimensioning of the traction inverters and auxiliaries such as the air compressor. This equipment must be able to withstand operation at 400V and must therefore be voltage sized accordingly. In addition, it must provide its full power under a voltage of 200V. It is therefore subjected to strong currents which implies larger-sized current switchers.

Regarding the two other uses (perfectly regulated DC voltage and scarcely variable DC voltage) the fuel cell must be associated with a DC/DC converter which must also be extra-dimensioned on account of the voltage variation of the fuel cell. It is the object of the present patent application to limit the implications of this constraint in respect of the size, weight and cost of the converter.

FIG. 4 shows a prior art step-up chopper.

The step-up chopper comprises at least one switch K, a diode D, an inductor L and an output is capacitor Cd.

Said chopper is said to be an accumulating chopper. When the switch is closed, the current increases in the inductor which then stores the energy in electromagnetic form. When the switch is opened, the voltage increases at its terminals until the diode starts to conduct. The inductor therefore releases part of the energy it has stored in the form of a higher output voltage.

If the switch is not switched, the output voltage is equal to the input voltage on account of diode conduction. If the switch is switched, the storage and transfer of energy of the inductor enables the output energy to be supplied in the form of a higher voltage. The higher the output voltage with respect to the input voltage, the greater the constraints on the converter. The switch must withstand the output voltage when it is opened. Also, the current passing through it is stronger the more the electric power is supplied under a low voltage. In practice, the technical constraints relating to voltage, current and switch losses limit the use of the step-up chopper assembly to step-up coefficients in the order of two or three.

In principle, with a step-up chopper the output voltage is always greater than the input voltage. This implies that the output voltage of the fuel cell, at any time, is lower than the voltage of the discharged battery or regulated voltage.

A step-up chopper stage cannot ensure short-circuiting protection for the fuel cell. A short circuit at the output of the step-up chopper translates as short-circuiting of the fuel cell which it may not be able to withstand. An ancillary switch is required which can be rapidly opened in the event of a short-circuit. In this case a protection must be integrated such as circuit breaker, relay or auxiliary transistor.

A reduction in the size of a step-up chopper leads to increasing the frequency used on account of the reduced size of the components. It is also necessary to improve the cooling of the circuit to extract the heat produced within a reduced space.

Increasing the frequency of a step-up chopper is limited by the strong constraints on the switch and diode which are sized both for the highest voltage and for the strongest current, and is limited by the technological difficulties involved in producing strong current inductors operating at high frequency.

On account of the voltage and current constraints of switches and diodes, an increase in frequency rapidly translates as a substantial increase in the switching losses of these components.

The function of the inductor is to store energy in electromagnetic form. Part of this energy is located in the winding of the element and gives rise to eddy current copper losses. High power, strong current inductors are technically difficult to fabricate due to these eddy current losses. These difficulties are heightened when raising the frequency of the assembly.

FIG. 5 shows a second example of a prior art DC/DC converter.

The DC/DC converter comprises an inverter W followed by a transformer Z, a bridge of diodes Pt, a smoothing inductor LS and an output capacitor Cs. The inverter W converts the DC voltage derived from the fuel cell into an AC voltage applied to the transformer Z. At the output of the transformer, the diode bridge rectifies the AC voltage into DC voltage. The smoothing inductor LS smoothes the DC voltage.

The advantage of this converter is the use of a transformer with which it is possible, without over-sizing, to achieve high step-up coefficients between the input voltage and the output voltage.

The transformer transfers the energy directly between its primary and secondary. Unlike the inductor, it must not store strong electromagnetic energy. On this account, high-power transformers operating at high frequency are easier to fabricate than inductors. The windings may be designed to have low eddy current losses even at high frequency (>50 KHz).

Also, the assembly using an inverter and a transformer can withstand short-circuiting and limits the current at its output. In the event of a short-circuit, the fuel cell is protected.

This assembly is supplied by the fuel cell whose voltage is highly variable. The components of the inverter, diodes and transformer must be oversized accordingly.

This over-sizing is a heavy constraint for the converter, translating as an increase in its weight, volume and hence cost, and as an increase in its losses and hence a drop in its yield.

The invention does not have the above-mentioned shortcomings.

DESCRIPTION OF THE INVENTION

The invention relates to an electric converter for fuel cell comprising current inverter means. The converter comprises a voltage step-down chopper mounted between the fuel cell and the current inverter means, and control means to deliver a command signal applied to switching means of the voltage step-down chopper so that, under the action of the command signal:

- the value of the mean voltage at the input of the current inverter means is lowered to a threshold value in a first functioning zone of the fuel cell called cell electrode activation zone,
- the value of the mean voltage at the input of the current inverter means is maintained at the voltage value at the cell terminals in a second functioning zone called cell resistance zone, and
- the output current of the converter is limited when the output current of the current inverter means reaches a maximum set value.

According to an additional characteristic, in the cell resistance zone, the current inverter means are commanded so that the value of the peak voltage output from the inverter is substantially equal to the threshold value.

According to a further characteristic, the converter comprises at least one transformer at the output of the current inverter means.

According to a further characteristic, the transformer is voltage step-up transformer.

According to a further characteristic, the current inverter means comprise a bridge with four switches.

According to a further characteristic, the current inverter means are of push-pull type with two switches.

According to a further characteristic, the converter comprises a first and second transformer and the current inverter means comprise first and second switches, so that the first switch is mounted in series with the primary winding of the first transformer and the second switch is mounted in series with the primary winding of the second transformer, the secondary windings of the first and second transformers being connected in parallel.

According to a further characteristic, the first and second transformers have planar technology.

According to a further characteristic, the converter comprises a rectifier.

According to a further characteristic, the rectifier comprises diode assemblies mounted in series or in a matrix of diodes.

According to a further characteristic, the step-down chopper comprises at least one switch with IGBT technology.

According to a further characteristic, the current inverter means comprise MOSFET transistors.

According to a still further characteristic, the converter comprises filtering means.

The electric converter for fuel cell according to the invention has numerous advantages.

The switching means of the voltage step-down chopper comprise at least one switch. Advantageously, only the switch of the voltage step-down chopper withstands the maximum voltage derived from the fuel cell. The current inverter means can therefore be sized for the value of the threshold voltage which is lower than the maximum voltage. If the inverter means use a complete bridge with four switches, the voltage to be taken into account for sizing is the threshold value. If the inverter means are of push-pull type with two switches, the constraint is twice the threshold value but, on the other hand, the mean current constraint may be reduced by one half.

Also, the switch of the step-down chopper is switched on over the largest functioning range of the converter. It can therefore be chosen to have technology which minimizes conduction losses, for example IGBT-type technology with low voltage drop. In this case, when the fuel cell is functioning in zone (I), the low current level during the switching phases makes it possible to maintain switching losses at a very low level.

The functioning of the current inverter means under a constant voltage constraint (threshold voltage) allows the use of MOSFET-type field effect transistors (MOSFET: Metal-Oxide Semiconductor Field Effect Transistor) sized accordingly. The absence of extensive over-sizing of the components forming the converter of the invention (unlike in the prior art) is an important point for minimizing losses. MOSFET transistors are highly suitable for fabricating converters operating at high frequency. On the other hand, their stray resistance in the conductive state quickly increases as voltage increases. In practice, this stray resistance leads to the use of several transistors in parallel to switch strong currents.

The smoothing inductor of the assembly advantageously has very little energy to store and exchange. When the switch of the step-down chopper is switched, the current is low and hence the energy managed by the inductor is low. Similarly, when the current inverter means ensure voltage step-up through the simultaneous conduction phase of the switches, the step-up coefficient (ratio between the threshold value Vs and voltage Vp at the cell terminals) is very low and the energy managed by the inductor is consequently also very low.

On account of the very low coefficient of voltage step-up, the output diodes conduct with a conduction time close to 50% which limits their peak current, the level of reverse recovery current when blocked and associated losses.

The functioning of the transformer under a defined voltage, with very little variation in the phase times of the inverter means, allows the transformer to be sized with a magnetic inductance deviation close to the maximum deviation of the magnetic materials without any risk of saturation during transitory functioning phases of the converter.

Since the constraints of the inverter means, transformer and inductor are less than in the prior art, it is possible to fabricate a converter of smaller volume which leads to an increase in operating frequency.

The presence of the transformer can provide an output voltage that is much higher than the input voltage with no particular constraint. It is possible to use a transformer of planar technology which is well adapted to high operating frequencies and may be easily cooled.

Also, the converter of the invention advantageously withstands short-circuiting and protects the fuel cell.

For high power, high frequency applications, the constraints of the different components (switches, diodes, inductors, transformers, capacitors) are such that it is necessary to use an association of elementary components in parallel and/or in series to meet the various desired functions. For example, the switch containing MOSFET transistors must be able to switch at a very fast rate, have negligible stray cabling inductance (so as not to slow down current increase rate and not to dissipate the energy stored in this stray inductance), have very low resistance in the conductive state and must be able to transfer these heat losses to a heat sink without overheating. At high frequency, this function is then necessarily achieved by placing in parallel several components to be able to achieve sufficiently low stray cabling inductance.

Preferably, it is also possible to use a large number of small-size components adapted to industrial standards. The advantages of using standard components, inter alia, are:
  lower cost as compared to using less common components;
  the advantage of having several suppliers to obtain components;
  strong component reliability due to their production in large quantities;
  much reduced internal and cabling inductance through the easy placing in parallel of components;
  fast, easy piloting of these components on account of their small size.

The electric converter of the invention also comprises rectifying means with diodes. The diodes of the rectifying means are mounted in series or in the form of a diode matrix. This makes it possible to use standard industrial components offering fast speed. The speed of a diode is characterized by its reverse recovery time, i.e. the time during which the diode allows the current to pass in reverse and is not yet able to block it. This phase gives rise to many losses. Reverse recovery time is greater the higher the voltage withstand strength of the diode is. The placing in series or in a matrix of diodes having a low voltage withstand strength instead of a single diode for example having a high voltage withstand strength, enables a relatively short reverse recovery time to be obtained which is the time of diodes having low voltage withstand strength. This is an advantage for reducing losses and allows functioning at a higher frequency to increase compactness.

BRIEF DESCRIPTION OF THE FIGURES

Other characteristics and advantages of the invention will become apparent on reading a preferred embodiment of the invention given with reference to the appended figures in which.

DETAILED DESCRIPTION OF EMBODIMENTS OF THE INVENTION

FIGS. 1 to 5 were described previously, no further description is necessary.

Figure 1:
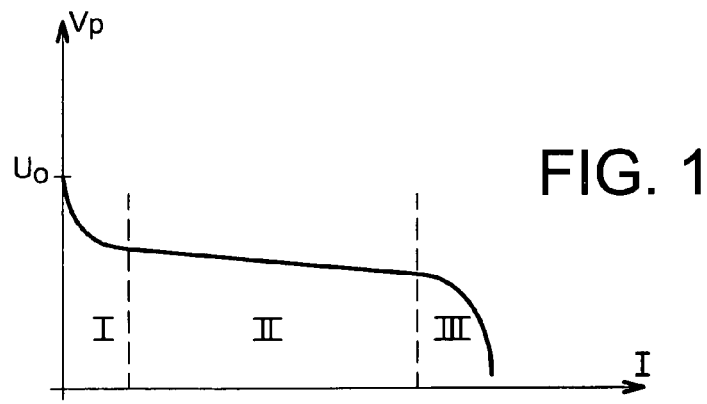
FIG. 1 shows the voltage variation at the terminals of a fuel cell in relation to the current supplied by the fuel cell.
Figure 2:
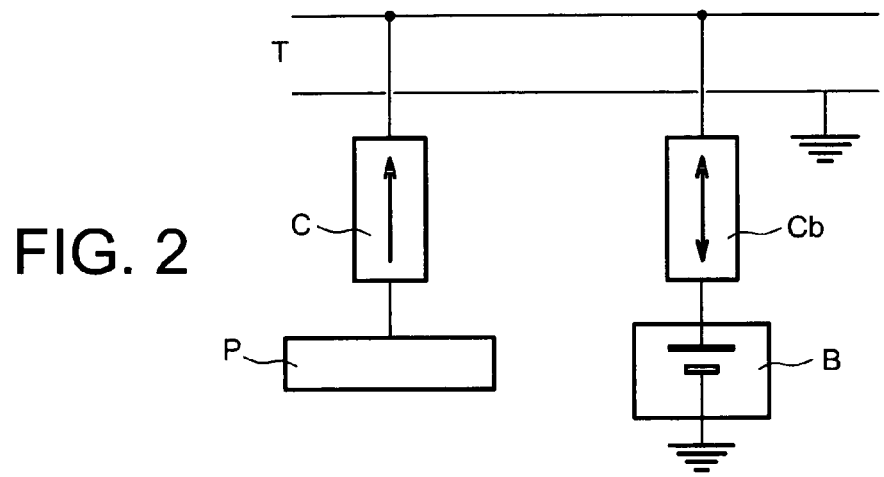
FIG. 2 shows a first example of a prior art voltage regulation circuit for a fuel cell.
Figure 3:
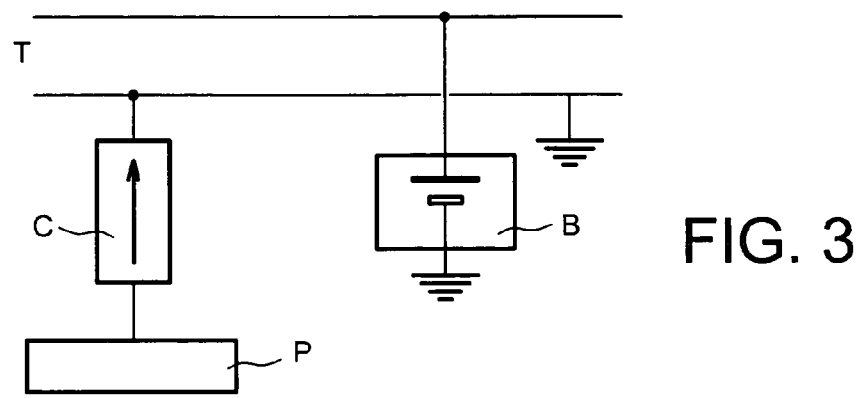
FIG. 3 shows a second example of a prior art voltage regulation circuit for a fuel cell.
Figure 4:
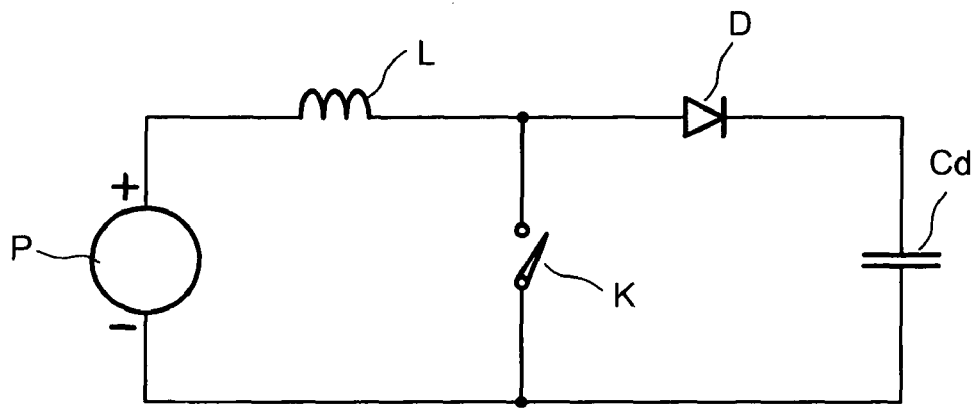
FIG. 4 shows a first example of a converter used in association with a voltage regulation circuit according to the prior art.
Figure 5:
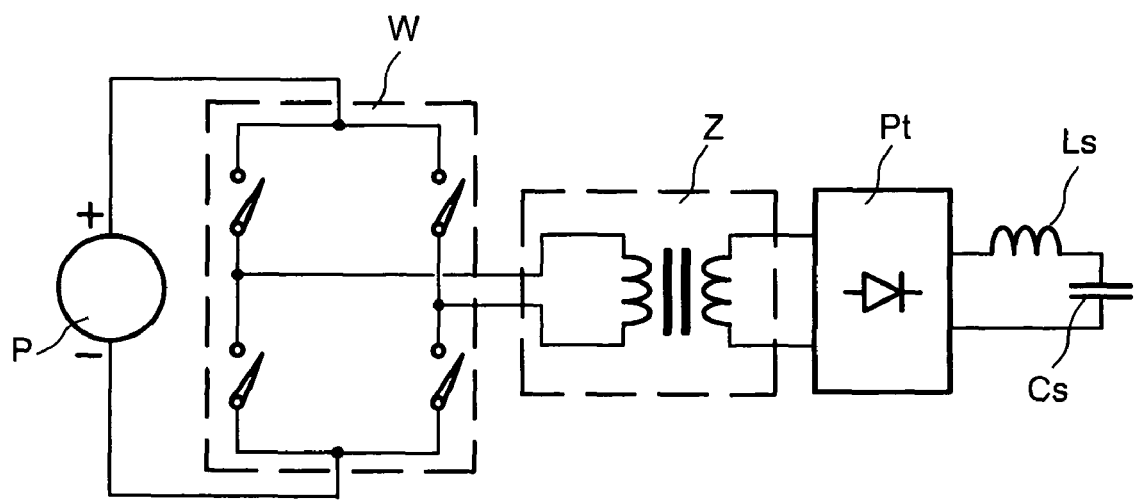
FIG. 5 shows a second example of a converter used in association with a voltage regulation circuit according to the prior art.
Figure 6:
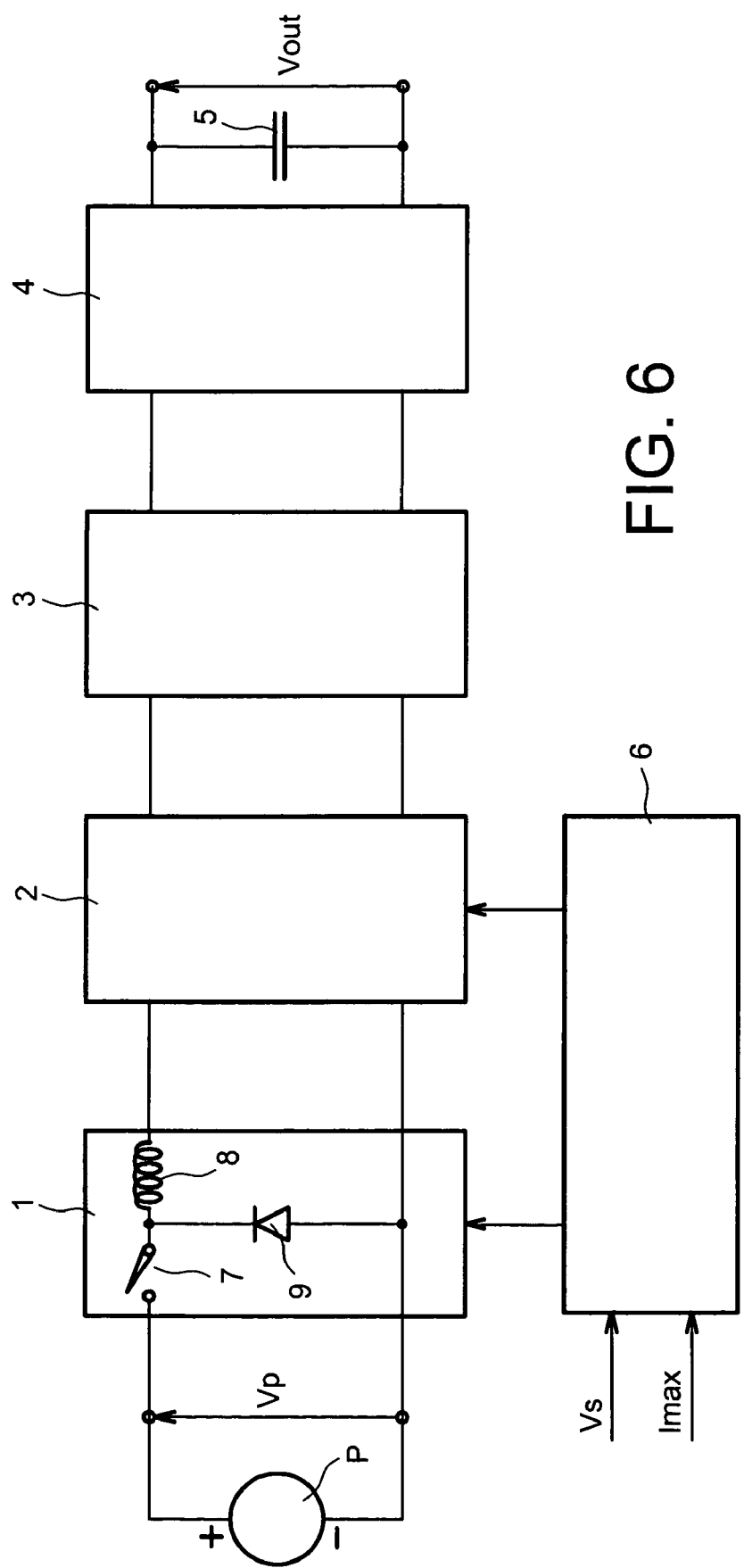
FIG. 6 is a diagram showing the principle of an electric converter for fuel, cells according to the invention.
Figure 7:
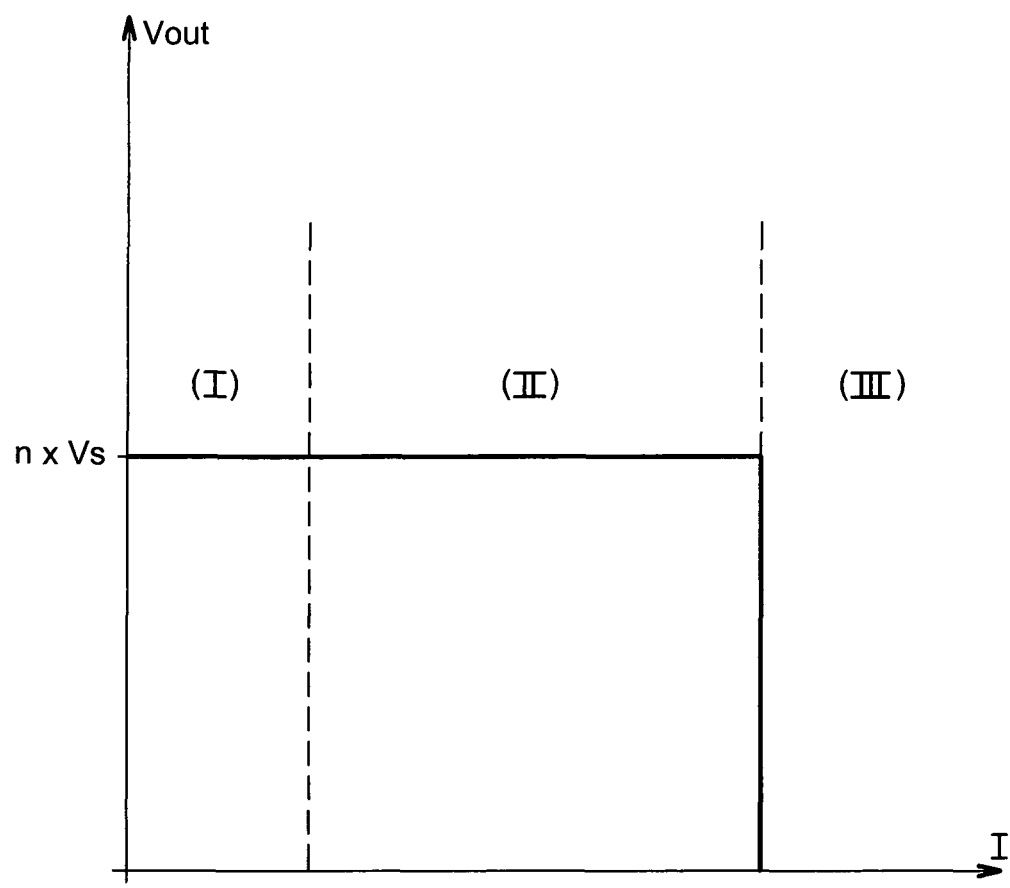
FIG. 7 shows the variation in the output voltage of the electric converter of the invention in relation to the current supplied by the fuel cell.

FIG. 6 is a diagram showing the principle of the electric converter for fuel cell according to the invention, and FIG. 7 shows the output voltage Vout of an electric converter for fuel cell according to the invention in relation to the current I delivered at the output of the current inverter means.

The converter comprises a voltage step-down chopper 1, a current inverter 2, a transformer 3, a rectifier 4, a filtering capacitor 5 and a command circuit 6. The voltage step-down chopper 1 comprises, for example, a switch 7, a self-inductor 8 and a diode 9. The command circuit 6 pilots the switch of the step-down chopper and the switches (not shown FIG. 6) of the current inverter 2. A set threshold voltage Vs and a set maximum current Imax are applied to the command circuit 6.

As mentioned previously (cf. FIG. 1), a distinction can be made between three zones of voltage variation Vp of the fuel cell, namely a cell electrode activation zone (I), a resistance zone (II) and a diffusion zone (III) (cf. FIG. 7).

In the cell electrode activation zone (I), the switch 7 of the voltage step-down chopper is regularly switched from the conducting state to the off state and reciprocally, so as to allow the delivered current to pass in phase-controlled fashion and therefore to lower the input voltage of the inverter. During this phase, the conduction time of the inverter switches may be fixed. The on/off switching of switch 7 lasts until the voltage Vp reaches the threshold voltage n×Vs (n being the transforming ratio of the transformer) which therefore corresponds to the changeover from activation zone (I) to resistance zone (II). As will be obvious for persons skilled in the art, it is to be noted here that the voltage which corresponds to the changeover from activation zone (I) to resistance zone (II) cannot be defined for a precise voltage value but over a range of voltage values.

In resistance zone (II), the switch 7 of the voltage step-down chopper is maintained constantly closed. The mean voltage at the input of the current inverter is then equal to the voltage Vp at the cell terminals. Preferably, in the resistance zone (II) the current inverter is commanded so that the peak voltage it delivers is substantially equal to the threshold voltage Vs. The conduction phases of the current inverter switches are then piloted for this purpose by the command circuit.

The output voltage of the converter Vout is therefore substantially equal to voltage Vs multiplied by the transforming ratio n of the transformer.

Switch 7 is maintained closed for as long as the voltage delivered by the fuel cell remains within the resistance zone (II). When the current at the output of the current inverter reaches the maximum set value Imax, the switch 7 of the step-down chopper switches to limit the output current of the converter and therefore enable resistance to short-circuiting and protection of the fuel cell. Preferably, the set value Imax is chosen so that the maximum current which the fuel cell is able to provide before its voltage drops is not reached.

Figure 8:
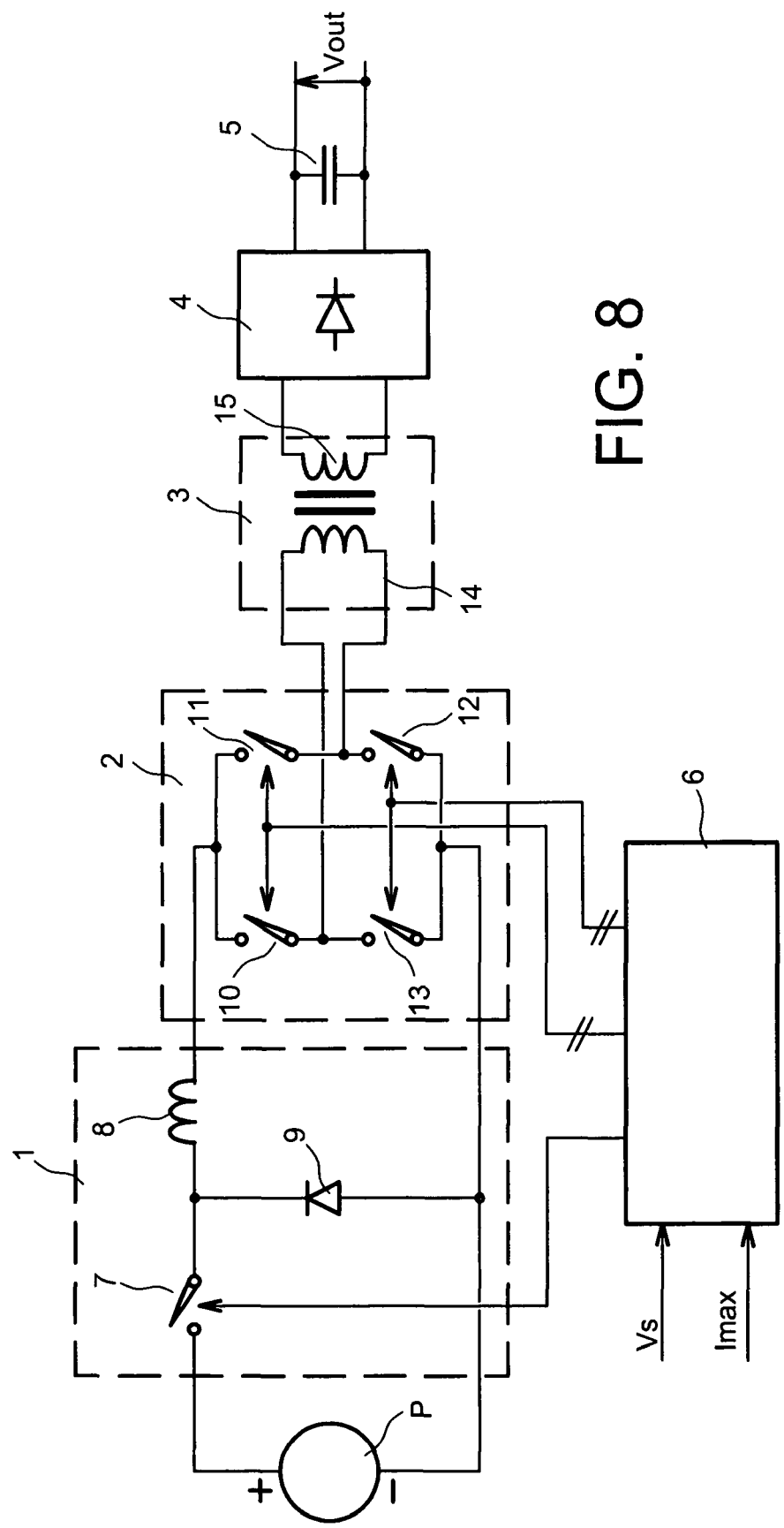
FIG. 8 shows a first example of an electric converter for fuel cell according to a first embodiment of the invention.

FIG. 8 shows a first example of an electric converter according to a first embodiment of the invention.

As mentioned above, the converter comprises a voltage step-down chopper 1, a current inverter 2, a transformer 3, a rectifier 4, a filtering capacitor 5 and a command circuit 6. The voltage step-down chopper consists of a switch 7, an inductor 8 and a free wheel diode 9.

The current inverter 2 is mounted at the output of the voltage step-down chopper 1. It comprises a bridge of four switches 10, 11, 12, 13. The high frequency AC current supplied by the current inverter 2 is applied to the primary winding 14 of transformer 3. Transformer 3 is preferably a step-up transformer intended to step up the voltage output from the fuel cell to a level adapted to the application. The secondary winding of the transformer 15 is connected to the rectifier 4 which rectifies the current passing through the secondary winding so as to supply it to the filtering capacitor 5.

The voltage at the terminals of the current inverter 2 is zero during the simultaneous conduction phase of the switches which enable the voltage to be stepped up. The command circuit 6 pilots this simultaneous conduction phase so that the voltage at the terminals of the inverter is equal to Vs when either one of the diagonals of the current converter is conducting.

When the converter output current reaches value Imax, the switch 7 switches to limit the current.

Figure 9:
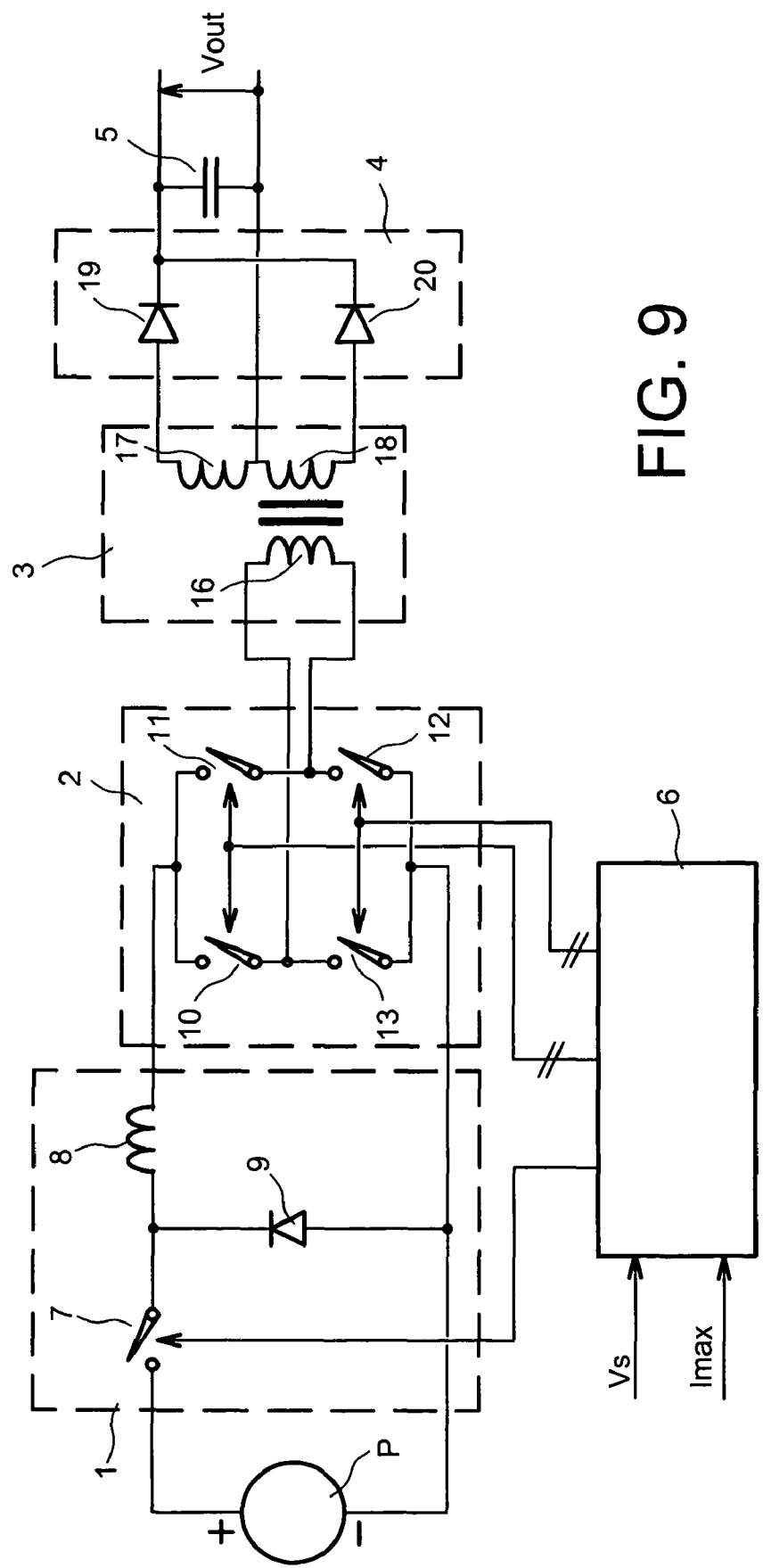
FIG. 9 shows a second example of an electric converter for fuel cell according to the first embodiment of the invention.

FIG. 9 shows a second example of electric converter for fuel cell according to the first embodiment of the invention.

The transformer 3 has two secondary windings 17 and 18 which have identical numbers of turns and are connected in series. The rectifier 4 consists of two diodes 19 and 20. The two windings in series associated with the two diodes form a known rectifying system with mid-point transformer.

Figure 10:
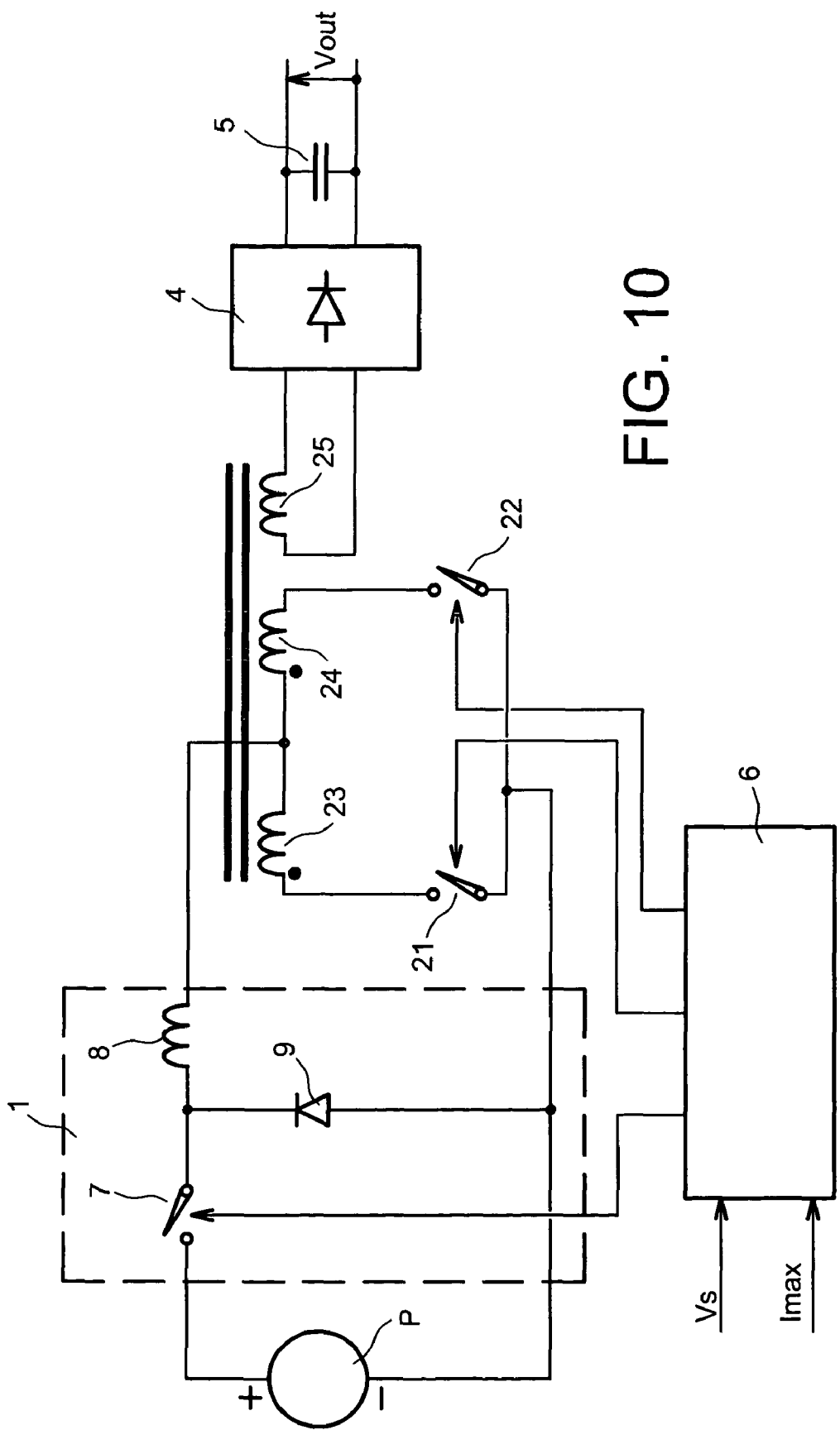
FIG. 10 shows an electric converter for fuel cell according to a second embodiment of the invention.

FIG. 10 shows an electric converter for fuel cell according to a second embodiment of the invention.

The transformer 3 comprises two primary windings 23, 24 connected in series and having the same number of turns. The ends of the windings 23, 24 are connected to the positive terminals of the respective switches 21 and 22 piloted by the command circuit 6. The mid-point voltage of windings 23, 24 is zero when the two switches 21 and 22 are conducting. It is equal to Vs when only one of the switches is conducting. When a switch is conducting, the voltage at the terminals of the conducting switch is zero, the mid-point voltage is equal to Vs and the voltage at the terminals of the other switch which is then open is equal to 2Vs on account of transformer coupling.

The secondary of the transformer may be single, associated with a four-diode rectifier, or consist of two windings having the same number of turns associated with two diodes.

Figure 11:
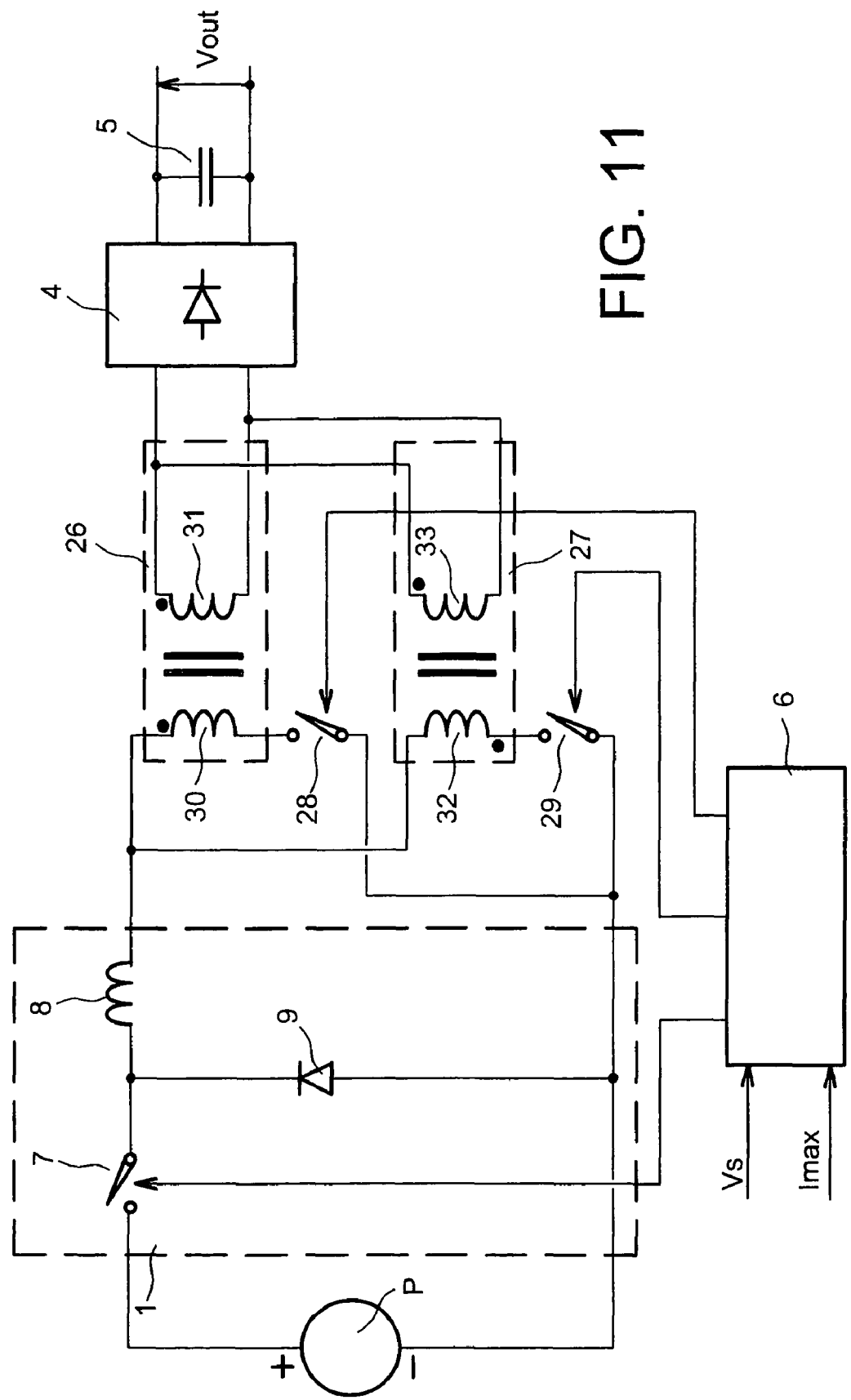
FIG. 11 shows an electric converter for fuel cell according to a third embodiment of the invention.

FIG. 11 shows an electric converter for fuel cell according to a third embodiment of the invention.

The converter comprises two transformers whose secondaries are connected in parallel.

As a general rule, according to known art, inverters using four switches for low voltage are little used since the interconnections of the four switches and with the winding of the transformer must all have very low cabling inductance. This physical constraint is technically difficult to achieve.

The inverter only using two switches simplifies the scarcely inductive fabrication of the cabling connections. On the other hand, the two primary windings of the transformer must be very well coupled together. Similarly, these two windings must have very good coupling with the secondary winding or windings.

The schematic in FIG. 11 shows the advantages of using only two switches and not requiring transformers with two primary windings which need to be very well coupled together. The two transformers 26 and 27 have a single primary winding and one or more secondaries that are very well coupled to this single primary. These two transformers are technically much easier to fabricate. On this account, planar transformers which use windings consisting of cut copper strips or printed circuits may be used. These transformers may be easily cooled and are therefore adapted to high frequency operation. This allows a gain in converter compactness. The use of planar technology made possible by this assembly also brings gains in cost for volume production.

The invention claimed is:

1. Electric converter for fuel cell (P) comprising current inverter means (2), a voltage step-down chopper (1) mounted between the fuel cell (P) and the current inverter means (2), and command means (6) for delivering a command signal applied to switching means (7) of the voltage step-down chopper (1) so that, under the action of the command signal:

the switching means (7) of the voltage step-down chopper (1) is regularly switched from a conducting state to an off state and reciprocally, so as to lower the value of the mean voltage at the input of the current inverter means to a threshold value (Vs) in a first functioning zone (I) of the fuel cell, called cell electrode activation zone, the switching means (7) of the voltage step-down chopper (1) is maintained constantly closed, so as to maintain the value of the mean voltage at the input of the current inverter means (2) at the voltage value at the cell terminals (Vp) in a second functioning zone (II) of the fuel cell, called cell resistance zone, and when the current at the output of the current inverter means (2) reaches a maximum value (Imax), the switching means (7) of the voltage step-down chopper (1) is switched to limit the output current of the electric converter.

2. Converter as in claim 1, wherein, in the cell resistance zone (II), the current inverter means (2) are commanded so that the value of the peak voltage output from the inverter is substantially equal to the threshold value (Vs).

3. Converter as in claim 1, further comprising at least one transformer (3) at the output of the current inverter means.

4. Converter as in claim 3, wherein the transformer (3) is a voltage step-up transformer.

5. Converter as in claim 1, wherein the current inverter means comprise a bridge with four switches (10, 11, 12, 13).

6. Converter as in claim 1, wherein the current inverter means are of push-pull type with two switches (21, 22).

7. Converter as in claim 3, comprising a first (26) and a second (27) transformer, wherein the current inverter means comprise a first (28) and a second (29) switch, so that the first switch (28) is mounted in series with the primary winding (30) of the first transformer (26) and the second switch (29) is mounted in series with the primary winding (32) of the second transformer (27), the secondary windings (31, 33) of the first and second transformers being connected in parallel.

8. Converter as in claim 7, wherein the first (26) and second (27) transformers have planar technology.

9. Converter as in claim 1, further comprising a rectifier (4).

10. Converter as in claim 9, wherein the rectifier comprises assemblies of diodes (9) mounted in series or in a matrix of diodes.

11. Converter as in claim 1, wherein the step-down chopper comprises at least one switch (7) of IGBT technology.

12. Converter as in claim 1, wherein the current inverter means (2) comprise MOSFET transistors.

13. Converter as in claim 1, further comprising filtering means (5).

\* \* \* \* \*